Patented Mar. 12, 1935

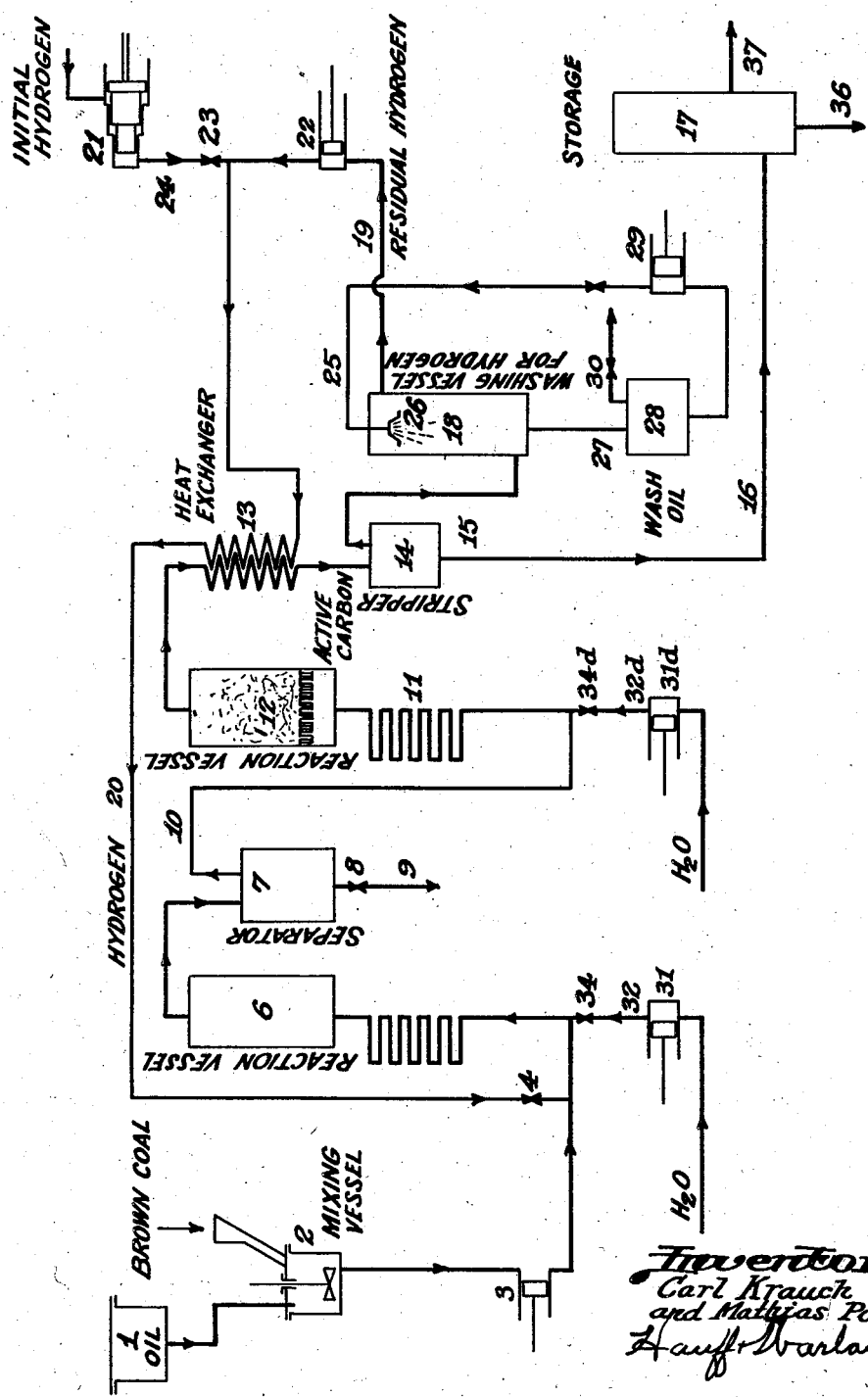

1,994,075

UNITED STATES PATENT OFFICE 1,994,075

CONVERSION OF SOLID FUELS AND PRODUCTS DERIVED THEREFROM OR OTHER MATERIALS INTO VALUABLE LIQUIDS

Carl Krauch, Ludwigshafen-on-the-Rhine, and Mathias Pier, Heidelberg, Germany, assignors to Standard-I. G. Company, Linden, N. J., a corporation of Delaware Application July 29, 1932, Serial No. 625,654
In Germany February 14, 1925

9 Claims. (Cl. 196—53)

Our invention relates to the destructive hydrogenation of carbonaceous materials and, in particular, to that process which is carried out in the presence of a catalyst immune to sulphur poisoning as described and claimed in our copending application Ser. No. 86,646, now Patent No. 1,890,434, of which this application is a continuation-in-part.

The object of our invention is to provide a catalyst which will act efficiently in the promotion of the conversion of carbonaceous substances into valuable liquids by destructive hydrogenation.

In our application Ser. No. 86,646, we have indicated that mixed catalysts containing metals or oxygen containing compounds, usually oxides of metals, in particular those of the sixth group of the periodic system and a substance containing sulphur, especially free sulphur or inorganic sulphides, although inorganic sulphites and sulphates may also be used, are very efficient in the promotion of the destructive hydrogenation of carbonaceous materials.

It is to the utilization of mixed catalysts containing free heavy metals the oxides of which are difficultly reducible (by which term is meant oxides which are not reduced under the conditions prevailing in the said destructive hydrogenation), in particular those from group 6 of the periodic system, or difficultly reducible oxygen containing compounds, preferably oxides, of metals, in particular those from said group 6, and a substance comprising sulphur in any form, for the destructive hydrogenation of carbonaceous materials that this application is directed. The sulphur, whether free or in a combined form, is preferably employed as an added substance.

Among the most suitable specific mixtures of the type defined above for the destructive hydrogenation of carbonaceous materials may be mentioned molybdic acid and zinc sulphide, ammonium molybdate and manganese sulphide, molybdenum sulphide and tungstic acid, chromium oxide and cobalt sulphide, molybdic acid and sulphur, tungstic acid and hydrogen sulphide, ammonium molybdate and nickel sulphide or vanadium sulphide, the oxides of manganese or of iron or of nickel or of cobalt or of titanium or of vanadium or of aluminium or of zinc together with sulphur or hydrogen sulphide or metal sulphides, in particular sulphides from group 6 of the periodic system, or metals from said group 6 or iron or cobalt or nickel or titanium or vanadium together with sulphur or sulphides, in particular those from group 6 of the periodic system; as for example vanadium in combination with molybdenum sulphide or tin sulphide or cadmium sulphide. Of the sulphates suitable as constituents for the aforesaid catalyst mixtures those of zinc and cadmium are of particular advantage.

The said sulphides or sulphates may be present in the mixture with the said heavy metals or difficultly reducible oxygen containing metal compounds in any proportion since even small amounts of the one constituent promote the activity of the other, but it is preferable to operate with mixtures in which each constituent is present in an amount of more than 5, and more particularly of more than 10, per cent.

The said sulphur or sulphur compounds enhance the catalytic activity of the said heavy metals or difficultly reducible oxygen containing metal compounds.

These mixed catalysts may be caused to act on solid or liquid carbonaceous material in any suitable manner. They may be added to the solids or liquids or, in the case of liquids, they may be placed in the reaction vessel and the liquids brought into contact with them in a vaporized or other finely divided state.

As regards the materials to be treated, the invention can be applied to any sort of solid fuels, for example, hard or soft coal, brown coal, lignite, peat, wood, or similar materials, mineral oils, shale oils, or other solid or liquid bitumina, also distillation or extraction products of all of them, such as tars obtained therefrom, whether by ordinary destructive distillation or by low temperature carbonization, or brown coal bitumen, or tars or oils obtained by pressure hydrogenation of solid or liquid fuels, or components or conversion products of all the above mentioned materials, such as cracked products, coumaroné or any other resins or residues of their distillation, pitch, asphaltum and so on, or mixtures of several such products with each other, also of solids with the above-named liquids or of one or more of such products with other suitable organic liquids.

Especially when employing coal or liquid fuels, an addition of lignite or peat is often of advantage, often increasing the hydrogenizing action, avoiding several drawbacks and, in the case of solid substances, rendering their introduction easier. All the said materials may be used in the presence of substantial amounts of water and, if desired, water may be added as such. Sometimes the process of hydrogenation is hereby furthered. For example, lignite producer tar containing from 40 to 50 per cent of water may be used to advantage directly.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

We further discovered that the process according to the present invention is in many cases, and in particular when converting solid fuels or heavy oils or residues, greatly improved by being carried out in two parts or stages. In the first stage, the coal, tars or heavy petroleum products are converted into liquids poor in fractions of low boiling point by liquefaction or destructive hydrogenation with or without catalysts, while in the second stage the products of stage one are transformed into hydrocarbons of low boiling point, by destructive hydrogenation, but preferably with the aid of catalysts. Increased pressure is preferably employed in one or both stages. Insofar as catalytic masses are added in both stages, they may be of the same kind or different in quantity, concentration, or kind. The two stages can be effected in two separate or adjoining reaction vessels or in different parts of a single vessel constructed in a suitable manner. Even more than two stages may be employed successively in certain cases.

The gases serving for the reaction may consist of hydrogen alone or of mixtures containing hydrogen, for example a mixture of hydrogen with nitrogen, or water gas, or hydrogen mixed with carbon dioxide, hydrogen sulphide, water vapor or methane or other hydrocarbons. Or the hydrogen may be generated in the reaction chamber by the interaction of water and carbon monoxide, and the like. When employing nitrogen compounds as catalysts, and carbon monoxide and water, the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example, temperature and pressure employed or duration of the treatment, the products are poor or rich in products of low boiling point. Generally, the temperature ranges between 300° and 700° C., and the pressure, when used, should amount to at least 20 atmospheres and should preferably be much higher up to about 2000 atmospheres.

The process according to the present invention is preferably carried out in vessels which are constructed of or lined with highly alloyed steels such as chromium steel or chromium nickel steel.

In the following examples the time of reaction varies considerably, as might be supposed, depending on the nature of the raw material, the activity of the catalyst, temperature, pressure, and the like. In practice it is desirable to make a few preliminary runs in order to determine the time required for the best yields under a given set of conditions. Generally speaking, with batch operations, the total time may be from two to ten hours or more, depending on the yield desired, while with continuous operations the time is usually shorter. When continually feeding liquid or difficultly vaporizable oils, the rate of flow may be in the neighborhood of .3 to .8 volumes of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 liters per kilogram of carbonaceous material.

A suitable arrangement of apparatus for carrying out the process is illustrated in the accompanying drawing. The process may be further described with reference thereto.

Finely ground browncoal is pasted in the mixing vessel 2 with oil from the tank 1 and the mixture is thereafter forced by means of pump 3 together with hydrogen which is supplied from conduit 20, through the pre-heater 5, into the reaction vessel 6. The regulation of the amount of hydrogen necessary for the conversion is effected by means of valve 4. The separation of the solid and fluid and gaseous and vaporous portions takes place in the separator 7. The fluid and solid portions are released through valve 8 and removed form the reaction system through conduit 9, whereas the gaseous and vaporous parts are further heated in a coil 11 and then conducted into the second vessel 12, which is filled with molybdic acid admixed with cobalt sulphide. The distilled reaction products give off their heat in the heat exchanger 13 to the entering hydrogen and are thereby condensed. The obtained low boiling products are released from the stripper 14 through valve 15 and are conducted into a supply tank 17 by means of a conduit 16, whereas the hydrogen is conducted into the washer 18 and is there freed from the gaseous hydrocarbons with the assistance of oil. The oil is introduced into the upper part of the washer by means of conduit 25, sprayed through a nozzle 26 and again drawn off on the bottom. The oil is released through valve 27 into a receiver 28, from which the dissolved hyrocarbons escape through conduit 30. The oil is drawn off by means of pump 29, compressed and returned into the washer. The purified hydrogen leaves the washer through conduit 19 and is re-introduced into the system by the rotating pump 22 through conduit 20. Fresh hydrogen, compressed by means of compressor 21, may be introduced through conduit 24, the amount of such hydrogen being regulated by valve 23.

In case a catalyst is used in the first step, the addition is preferably made in the mixing vessel 2.

In case the conversion is to be made in the presence of water vapor, water is introduced by means of pumps 31 and 31a respectively, through conduit 32, into the reaction vessel 6, or through conduit 32a into the second reaction vessel 12. The regulation of the necessary amount of water is effected by means of valves 34 and 34a respectively. The water evaporates in the coils 5 and 11, is condensed behind the reaction oven in the heat exchanger 13 and collected at the bottom of tank 17. From there it may be drawn off through conduit 36, whereas the benzine is removed through an opening 37 positioned at a higher level in the tank.

The following examples will serve to further explain how our invention is carried out in practice, but we do not restrict our invention to these examples.

Example 1

Brown coal tar obtained in a gas producer fed with brown coal, is vaporized at a temperature of 500° C. and under a pressure of about 150 atmospheres, in a current of hydrogen, and the mixture is continuously passed over a contact mass consisting of a mixture of molybdic acid with an addition of 20 per cent its weight of cobalt sulphide. The gas is pumped round in a circular way while maintaining the pressure by an addition of fresh hydrogen, and separating the material by cooling. There is formed a mobile and nearly colorless product free from phenols, without any formation of coke, asphalt or other residue. From 35 to 45 per cent of the product distill up to 150° C., and the fractions up to 300° C. are colorless and fully saturated. At 350° C. only a small residue is left having a vaseline-like nature. The raw product can be used as a motor fuel or for manufacturing lubricating oils. An addition of say 1 per cent of ammonia, to the hydrogen is also useful.

A mixture consisting of 75 per cent, by volume, of hydrogen and 25 per cent of nitrogen may also be used, preferably at a pressure of 200 atmospheres.

Example 2

Dark colored residues of an American rock oil which at ordinary temperature are nearly solid and have a strongly unsaturated character are incorporated with an excess of a gas mixture composed of three parts, by volume, of hydrogen and 1 part of nitrogen and continuously passed under a pressure of 200 atmospheres and a temperature of from 450° to 500° C. over a catalyst prepared from an intimate mixture of 90 parts, by weight, of ammonium molybdate and 10 parts of zinc sulphide. A nearly colorless, mobile and saturated product is obtained besides a little methane, consisting of 40 per cent of colorless petrol boiling up to 150° C. and 60 per cent of a thin, yellowish product of a higher boiling point.

Example 3

Jura shale oil of 0,950 sp. gr. containing 4 per cent of sulphur which on distilling yields 6 per cent petrol up to 150° C. and 21 per cent of a pitch-like residue over 350° C. is treated as described in the foregoing example. The product is a mobile yellowish oil of 0.800 sp. gr. containing 35 per cent of saturated petrol boiling up to 150° C. and leaving at 200° C. a liquid only slightly colored residue.

Example 4

Mexican asphaltum is dissolved in its own weight of cyclohexane and treated in the aforedescribed manner. The cyclohexane is recovered unaltered, while the asphaltum which before the treatment contained 4 per cent of compounds boiling up to 250° C., 25 per cent more boiling up to 350° C., and 70 per cent of a hard pitch residue is converted into a mobile oil, free from oxygen compounds and chiefly consisting of petrol hydrocarbons besides a very small vaseline-like residue.

Rock oils of any origin may be treated as described in the above examples and thereby converted into refined products of much more valuable properties.

Example 5

Vaporized brown coal tar is incorporated with hydrogen and brought under a pressure of 200 atmospheres, and the mixture is passed at about 450° C. over a catalyst prepared from 70 parts of cobalt sulphide and 30 parts of chromic acid. On cooling, a product is condensed which contains some methanol and oxygen compounds of a higher order, about 40 per cent of benzine and products of a higher boiling point which may serve for a conversion into lubricating oils or for a repeated treatment as aforementioned. The hydrogen is circulated while replacing the consumed gases.

Example 6

A mixture of 1 part of finely divided coal pasted up with 1 part of an oil boiling above 325° C. and which has been obtained by destructive hydrogenation of said coal in a preceding working stage, is mixed with from 5 to 10 per cent of its weight of a catalyst consisting of 1 part of free molybdenum and 3 parts of free sulphur. The whole is then heated up to a temperature of 450° C. and thereupon at this temperature subjected to the action of hydrogen under a pressure of 200 atmospheres. 95 per cent of the coal is thereby converted into liquid hydrocarbons of which 20 per cent consist of benzines and 80 per cent of middle oil.

Example 7

A middle oil is passed at about 480° C. under a pressure of 200 atmospheres and in the presence of hydrogen over a rigidly arranged catalyst consisting of 10 per cent of metallic vanadium and 90 per cent of molybdenum sulphide. In this manner a liquid product is obtained of which 60 per cent consists of benzine and 40 per cent of middle oil. Instead of the said catalyst a catalyst consisting of 10 per cent of free titanium and 90 per cent of tungsten sulphide may be employed with the same success.

Our invention is not confined to the above examples; the conditions may be widely varied in various directions. For example, the pressures and temperatures may be higher or lower than stated above.

In the appended claims, the expression "distillation and extraction products thereof" is intended to relate only to solid and liquid distillation and extraction products and is not to be construed to include normally gaseous products of the distillation of solid and liquid fuels.

Wherever "metal oxides" are referred to in the claims, we contemplate within the scope of this expression not only the metal oxides per se, but also oxygen-containing compounds such as nitrates, carbonates, metal acids and the like which are converted to metal oxides under the conditions of working employed.

What we claim is:

1. The process of destructively hydrogenating carbonaceous substances such as solid and liquid fuels, distillation and extraction products thereof, which comprises treating them with hydrogen at a temperature between about 300° and 700° C. sufficient to promote the reaction, under a pressure of at least 20 atmospheres and in the presence of a catalyst containing a heavy metal sulphide associated with a substance selected from the group consisting of free heavy metals, the oxides of which are difficultly reducible and difficultly reducible metal oxides.

2. The process according to the preceding claim in which the substance associated with the heavy metal sulphide is a free metal of group 6 of the periodic system.

3. The process according to claim 1 in which the substance associated with the heavy metal sulphide is an oxide of a metal of group 6 of the periodic system.

4. The process of destructively hydrogenating carbonaceous substances such as solid and liquid fuels, distillation and extraction products thereof, which comprises treating them with hydrogen at a temperature between about 300° and 700° C. sufficient to promote the conversion, under a pressure of at least 20 atmospheres, and in the presence of a heavy metal sulphide associated with an oxide of a metal of group 6 of the periodic system, the conditions of working, such as temperature, pressure and the efficiency of the catalyst, being so adapted to each other as to give rise to the formation of substantial amounts of low boiling hydrocarbons of a benzine character.

5. The process of destructively hydrogenating carbonaceous substances such as solid and liquid fuels, distillation and extraction products thereof, into valuable liquids, which comprises treating them with a stream of hydrogen at a temperature between about 300° and 700° C. sufficient to promote the conversion, under a pressure of at least 20 atmospheres and in the presence of a heavy metal sulphide associated with an oxide of a metal of group 6 of the periodic system.

6. The process of converting carbonaceous substances such as solid and liquid fuels, distillation and extraction products thereof, into valuable liquids, which comprises treating them with hydrogen at a temperature between about 300° and 700° C., under a pressure upwards of 150 atmospheres, and in the presence of a heavy metal sulphide associated with a substance selected from the group consisting of metals of group 6 of the periodic system and their oxides.

7. The process of converting solid fuel materials into liquids which comprises treating them with hydrogen at a temperature between about 300° and 700° C., under a pressure of at least 20 atmospheres and in the presence of a heavy metal sulphide associated with a substance selected from the group consisting of free heavy metals, the oxides of which are difficultly reducible and difficultly reducible metal oxides.

8. The process according to the preceding claim in which the solid fuel employed as starting material is lignite.

9. The process according to claim 5 in which the metal of the sixth group is molybdenum.

CARL KRAUCH.
MATHIAS PIER.